(12) United States Patent
Xiong et al.

(10) Patent No.: US 12,120,008 B2
(45) Date of Patent: Oct. 15, 2024

(54) PERFORMANCE MEASUREMENT METHOD AND APPARATUS, DEVICE, AND STORAGE MEDIUM

(71) Applicant: ZTE CORPORATION, Guangdong (CN)

(72) Inventors: Quan Xiong, Guangdong (CN); Zheng Zhang, Guangdong (CN); Min Xiao, Guangdong (CN); Jun Guo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/913,275

(22) PCT Filed: Dec. 24, 2020

(86) PCT No.: PCT/CN2020/138877
§ 371 (c)(1),
(2) Date: Sep. 21, 2022

(87) PCT Pub. No.: WO2021/190009
PCT Pub. Date: Sep. 30, 2021

(65) Prior Publication Data
US 2023/0114176 A1 Apr. 13, 2023

(30) Foreign Application Priority Data
Mar. 24, 2020 (CN) .......................... 202010213323.4

(51) Int. Cl.
*H04L 43/067* (2022.01)
*H04L 43/0817* (2022.01)

(52) U.S. Cl.
CPC ........ *H04L 43/067* (2013.01); *H04L 43/0817* (2013.01)

(58) Field of Classification Search
CPC ..... H04L 43/0817; H04L 45/16; H04L 43/08; H04L 43/026; H04L 43/10;
(Continued)

(56) References Cited

U.S. PATENT DOCUMENTS

2016/0134535 A1    5/2016  Callon
2018/0316520 A1*  11/2018  Wijnands ................ H04L 45/50
(Continued)

FOREIGN PATENT DOCUMENTS

CN    105828218 A    8/2016
CN    106603406 A    4/2017
(Continued)

OTHER PUBLICATIONS

International Search Report mailed Mar. 22, 2021, for Application No. PCT/CN2020/138877 (two (2) pages).
(Continued)

*Primary Examiner* — Anh Nguyen
(74) *Attorney, Agent, or Firm* — KDW Firm PLLC

(57) ABSTRACT

Provided are a performance measurement method and apparatus, a device, and a storage medium. The method includes: creating a Bit Index Explicit Replication (BIER) flow; encapsulating a BIER flow measurement packet according to a performance measurement requirement of the BIER flow, where the BIER flow measurement packet carries BIER flow identification information; and sending the BIER flow measurement packet to a second communication node.

9 Claims, 6 Drawing Sheets

(58) Field of Classification Search
CPC ............ H04L 43/0829; H04L 43/0852; H04L 43/106; H04L 47/2483
See application file for complete search history.

(56) References Cited

U.S. PATENT DOCUMENTS

| | | | |
|---|---|---|---|
| 2019/0020736 A1* | 1/2019 | Patel | H04L 69/22 |
| 2019/0097944 A1* | 3/2019 | Kotalwar | H04L 12/185 |
| 2021/0266189 A1* | 8/2021 | Xie | H04L 12/18 |

FOREIGN PATENT DOCUMENTS

| | | |
|---|---|---|
| CN | 107294861 A | 10/2017 |
| CN | 109246018 A | 1/2019 |
| CN | 109756425 A | 5/2019 |
| WO | 2020041453 A1 | 2/2020 |

OTHER PUBLICATIONS

Mirsky et al., "Performance Measurement (PM) with Marking Method in Bit Index Explicit Replication (BIER) Layer", "draft-ietf-bier-pmmm-oam-05", Dec. 10, 2018.
Chinese Search Report for Application No. 2020102133234 dated Aug. 2, 2023.
Chinese Office Action for Application No. 2020102133234 dated Aug. 4, 2023.
Extended European Search Report issued in European Application No. 20927470.3, mailed Feb. 26, 2024, 11 pages.
Mirsky et al., "Performance Measurement (PM) with Marking Method in Bit Index Explicit Replication (BIER) Layer; Draft-IETF-BIER-PMMM-OAM-07.TXT," BIER Working Group, Internet Draft No. 7: 9 pages (Jan. 3, 2020).
Song et al., "Requirement and Solution for multicast Traffric Telemetry; Draft-Song-Multicast-Telemetry-01.TXT," Network Working Group, Internet Draft No. 1: 10 pages (Nov. 2, 2019).

* cited by examiner

PERFORMANCE MEASUREMENT METHOD AND APPARATUS, DEVICE, AND STORAGE MEDIUM

CROSS-REFERENCES TO RELATED APPLICATIONS

This is a National Stage Application, filed under 35 U.S.C. 371, of International Patent Application No. PCT/CN2020/138877, filed on Dec. 24, 2020, which is based on and claims priority to Chinese Patent Application No. 202010213323.4 filed with the China National Intellectual Property Administration (CNIPA) on Mar. 24, 2020, the disclosure of which is incorporated herein by reference in its entirety.

TECHNICAL FIELD

The present application relates to communication technology, for example, a performance measurement method and apparatus, a device, and a storage medium.

BACKGROUND

Bit Index Explicit Replication (BIER) technology is a new multicast technical architecture. Compared with a conventional forwarding mode where a distribution tree is constructed based on a multicast routing protocol, BIER uses a Bit Index Forwarding Table (BIFT) for forwarding and an intermediate node of a network has no need to maintain the state of multicast forwarding information so that the complex multicast protocol and multicast forwarding table are eliminated and efficient multicast distribution can be achieved. In such way, with the continuous rapid growth of a network scale/user scale, the major problems of the conventional multicast technology in aspects of cost, operation and maintenance, and the like are solved. A new multicast architecture of the network is defined based on the BIER technology which has the advantages of simple deployment, rapid convergence, and the support for ultra-large-capacity services. Meanwhile, the BIER technology can be combined with various virtual private networks (VPN) such as a Movable Virtual Private Network (MVPN), a Layer 3 Virtual Private Network (L3VPN), and an Ethernet Virtual Private Network (EVPN) so as to perfect VPN multicast. Under the new network architecture, the BIER technology provides an efficient multicast solution for various big video services such as Internet livecast and Internet Protocol television (IPTV), thereby improving network efficiency. However, how to identify a BIER flow and implement a BIER flow-based performance measurement function is an urgent problem to be solved.

SUMMARY

Embodiments of the present application provide a performance measurement method and apparatus, a device, and a storage medium, so as to identify a BIER flow and implement a performance measurement function.

An embodiment of the present application provides a performance measurement method applied by a first communication node. The method includes: creating a BIER flow; encapsulating a BIER flow measurement packet according to a performance measurement requirement of the BIER flow, where the BIER flow measurement packet carries BIER flow identification information: and sending the BIER flow measurement packet to a second communication node.

An embodiment of the present application provides a performance measurement method applied by a second communication node. The method includes: receiving a BIER flow measurement packet sent by a first communication node, where the BIER flow measurement packet carries BIER flow identification information: and identifying and measuring a BIER flow according to the BIER flow measurement packet.

An embodiment of the present application provides a performance measurement apparatus applied to a first communication node. The apparatus includes a creation module, an encapsulation module, and a sender. The creation module is configured to create a BIER flow. The encapsulation module is configured to encapsulate a BIER flow measurement packet according to a performance measurement requirement of the BIER flow, where the BIER flow measurement packet carries BIER flow identification information. The sender is configured to send the BIER flow measurement packet to a second communication node.

An embodiment of the present application provides a performance measurement apparatus applied to a second communication node. The apparatus includes a receiver and an identification and measurement module. The receiver is configured to receive a BIER flow measurement packet sent by a first communication node, where the BIER flow measurement packet carries BIER flow identification information. The identification and measurement module is configured to identify and measure a BIER flow according to the BIER flow measurement packet.

An embodiment of the present application provides a device including a communication module, a memory, and one or more processors. The communication module is configured to perform communication interaction between a first communication node and a second communication node. The memory is configured to store one or more programs. When the one or more programs are executed by the one or more processors, the one or more processors perform the method in any one of the preceding embodiments.

An embodiment of the present application provides a storage medium storing a computer program, where when the computer program is executed by a processor, the processor performs the method in any one of the preceding embodiments.

DETAILED DESCRIPTION

Embodiments of the present application are described below in conjunction with drawings.

Figure 1:
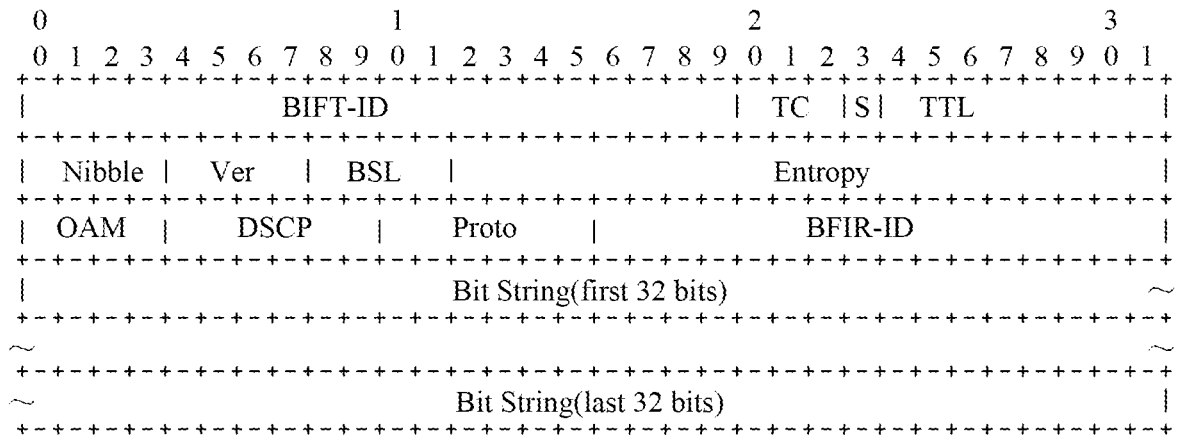
FIG. 1 is a schematic diagram of a BIER header encapsulation format in the related art.

Under a new network architecture, BIER technology provides an efficient multicast solution for various big video services, thereby improving network efficiency. FIG. 1 is a schematic diagram of a BIER header encapsulation format in the related art. The BIER header encapsulation format is based on a Multiprotocol Label Switching (MPLS) data plane, and a BIER message format is defined as shown in FIG. 1.

Figure 2:
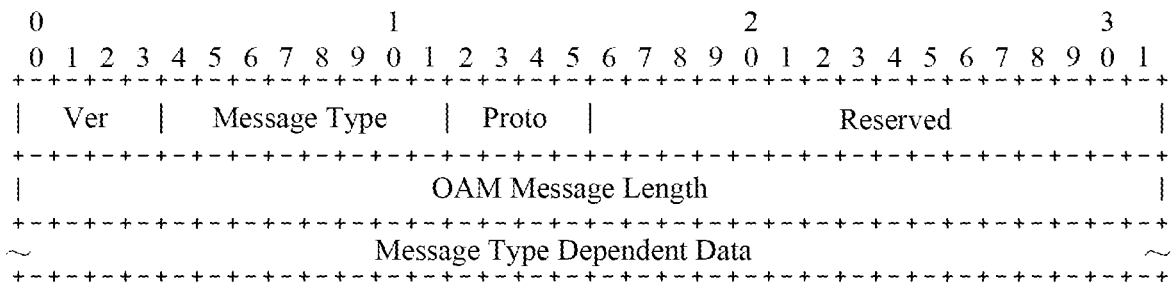
FIG. 2 is a schematic diagram of a BIER OAM header encapsulation format in the related art.

With the wide application of the BIER technology in multicast services and the expansion of a network scale, to ensure the effective transmission of a BIER packet, an Operation Administration and Maintenance (OAM) function is a basic requirement of a manageable and operable MPLS network. BIER OAM is an extended mechanism based on an MPLS OAM mechanism and the main function of BIER OAM is to effectively improve the management and maintenance capability of a BIER network and ensure the stable operation of the network. As defined in the standards of the Internet Engineering Task Force (IETF), a BIER OAM packet is immediately after a BIER header and identified by using a Proto field in the BIER header. If the Proto field is set to 5, it indicates that the packet immediately after the BIER header is the BIER OAM packet. In the case where a Proto field in a BIER OAM header is not zero, the following packet carried is a service packet. FIG. 2 is a schematic diagram of a BIER OAM header encapsulation format in the related art. A BIER OAM message format is defined as shown in FIG. 2.

Figure 3:
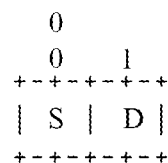
FIG. 3 is a schematic diagram of a format of an OAM field in a BIER header according to an embodiment of the present application.

Performance measurement (PM) is the focus of BIER OAM technology. BIER PM implements the performance measurement of the BIER network by measuring the delay, jitter, and packet loss rate of packets. Among standard definitions, the classification of measurement methods is defined in Request for Comments (RFC) 7799, and a passive performance measurement method is defined in RFC 8321. A marking method (MM) can measure the packet loss, delay, jitter and the like of real-time traffic by marking a particular number of packets or packets within a particular time interval. In the BIER network, the attributes of multicast packets, such as a packet loss rate and a delay can also be measured by the marking method including a single marker measurement and a double marker measurement. As shown in FIG. 1, the BIER header encapsulation format specified in IETF RFC 8296 is based on the MPLS data plane and includes an OAM field of 2 bits for indicating a marking method for performance measurement. FIG. 3 is a schematic diagram of a format of an OAM field in a BIER header according to an embodiment of the present application. As shown in FIG. 3, an S bit set to 1 indicates the single marker measurement and a D bit set to 1 indicates the double marker measurement. However, neither a flow-based measurement method nor how to identify a BIER flow is defined in the standards. Thus, a performance measurement function based on the BIER flow cannot be implemented.

As defined in the standards of the IETF, the BIER network can use a passive marker measurement method. A Bit-Forwarding Router (BFR) node performs packet loss measurement and delay measurement, and measurements on node, link, subnet, or end-to-end measurement can be performed at a source or sink node. A user may create different BIER subflows at a BFR, each subflow includes marked packets, and any BFR monitoring point through which a packet flow passes in the BIER network may identify the packet flow and measure a packet loss rate and a delay. A marker point may be set or cleared at an edge node of the BIER network so as to identify a particular BIER subflow and measure the performance of the BIER subflow such as packet loss and delay. Embodiments of the present application provide a flow-based performance measurement method for a BIER network. The method based on flow-based BIER packet encapsulation extends a flow (Flow) field to identify a BIER flow and implement the marker performance measurement function of the BIER flow. In the embodiments, the flow field has a length of 32 bits and carries BIER flow identification information.

Figure 4:
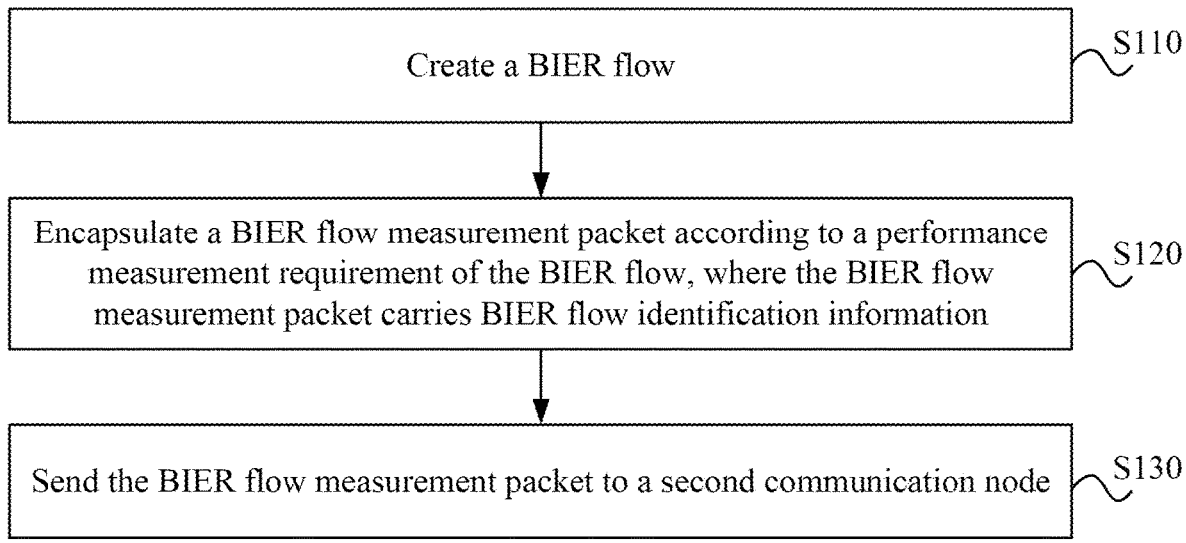
FIG. 4 is a flowchart of a performance measurement method according to an embodiment of the present application.

In an embodiment, FIG. 4 is a flowchart of a performance measurement method according to an embodiment of the present application. The embodiment is applied to a first communication node. For example, the first communication node may be a head BFR node. As shown in FIG. 4, the embodiment includes S110 to S130.

In S110, a BIER flow is created.

In S120, a BIER flow measurement packet is encapsulated according to a performance measurement requirement of the BIER flow, where the BIER flow measurement packet carries BIER flow identification information.

In S130, the BIER flow measurement packet is sent to a second communication node.

In the embodiment, the head BFR node creates the BIER flow, encapsulates the BIER flow measurement packet according to the performance measurement requirement of the BIER flow, and sends the BIER flow measurement packet to the second communication node so that the second communication node identifies the corresponding BIER flow according to the BIER flow identification information in the BIER flow measurement packet and records the number of packets or a timestamp, so as to calculate a packet loss rate or a delay of the BIER flow. For example, the second communication node may be a tail BFR node.

In an embodiment, the BIER flow identification information is configured for identifying a unique BIER flow and measuring and identifying the BIER flow. In the embodiment, each BIER flow corresponds to unique BIER flow identification information, that is, each BIER flow corresponds to a unique BIER identifier. The BIER identifier is included in the BIER flow identification information.

In an embodiment, the BIER flow measurement packet is a service packet encapsulated in a BIER header: and the encapsulating the BIER flow measurement packet according to the performance measurement requirement of the BIER flow includes: carrying the BIER flow identification information in a BIER header encapsulation format.

In an embodiment, carrying the BIER flow identification information includes: extending a flow field in the BIER header encapsulation format for measuring and identifying the BIER flow.

Figure 5:
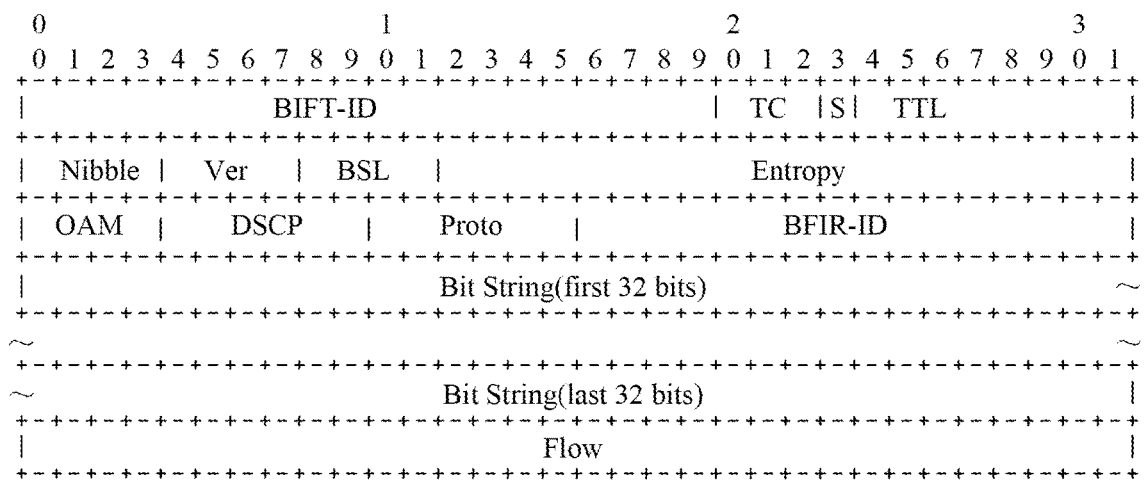
FIG. 5 is a schematic diagram of a format of a BIER header in which a flow field is extended according to an embodiment of the present application.

In the embodiment, the BIER header encapsulation format may be extended for the flow field for measuring and identifying the BIER flow. FIG. 5 is a schematic diagram of a format of a BIER header in which a flow field is extended according to an embodiment of the present application. As shown in FIG. 5, the BIER header encapsulation format is extended for the following flow field. The BIER flow is measured and identified using the flow field.

In an embodiment, the BIER flow measurement packet is a service packet encapsulated in a BIER OAM header: and encapsulating the BIER flow measurement packet according to the performance measurement requirement of the BIER flow includes: carrying the BIER flow identification information in a BIER OAM header encapsulation format.

Figure 6:
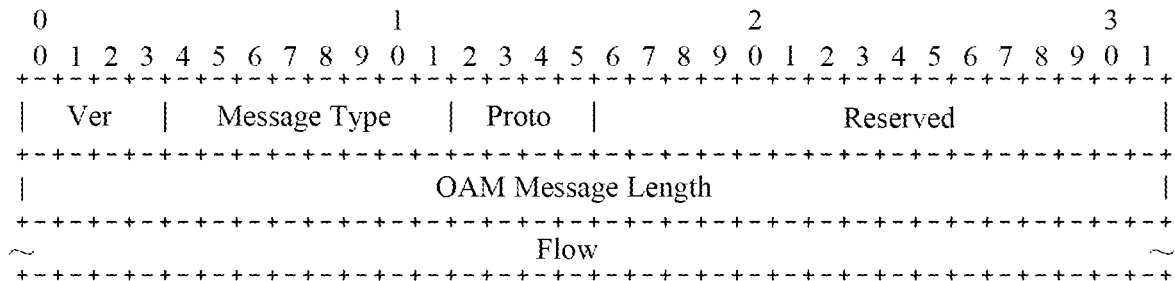
FIG. 6 is a schematic diagram of a format of a BIER OAM header in which a flow field is extended according to an embodiment of the present application.

In an embodiment, carrying the BIER flow identification information includes extending the BIER OAM header encapsulation format for a new message type for indicating that a message type of the BIER flow measurement packet is a BIER flow performance measurement message: and extending data corresponding to the BIER flow performance measurement message for a flow field for measuring and identifying the BIER flow:

In the embodiment, the flow field is an extension in the BIER OAM header. FIG. 6 is a schematic diagram of a format of a BIER OAM header in which a flow field is extended according to an embodiment of the present application. As shown in FIG. 6, the flow field is configured for measuring and identifying the BIER flow. In the embodiment, the performance measurement of the BIER flow is performed in the manner of carrying the service packet after a BIER OAM packet. In this case, the format of a measurement service packet is that the BIER OAM packet is immediately after the BIER header, where a Proto field in the BIER header is set to 5, and a Proto field in the BIER OAM header has to be set to a non-zero value, indicating that the service packet is carried after the BIER OAM packet. The flow field is carried in the BIER OAM packet and used for BIER performance measurement and the identification of the BIER flow: The new message type (Message Type) is added to the BIER OAM header, and the message type is set to 3, indicating that the message type of the BIER flow measurement packet is the BIER flow PM message and the BIER flow measurement packet is configured for flow-based performance measurement. Data corresponding to the message type (Message Type Dependent Data) in FIG. 2 is extended for the flow field, as shown in FIG. 6.

In an embodiment, the format of the flow field includes one of: a format consisting of a flow identifier and reserved bits: a format consisting of a flow label: or a format consisting of a flow identifier, a marker measurement field, and reserved bits.

Figure 7:
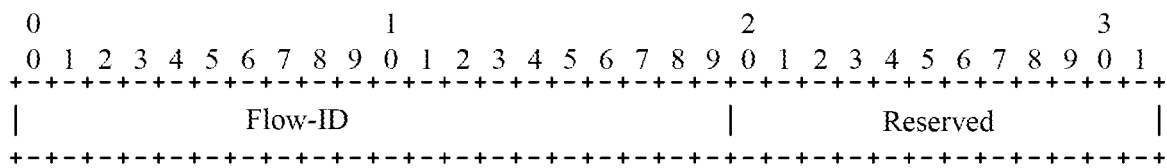
FIG. 7 is a schematic diagram of a format of a flow field according to an embodiment of the present application.
Figure 8:
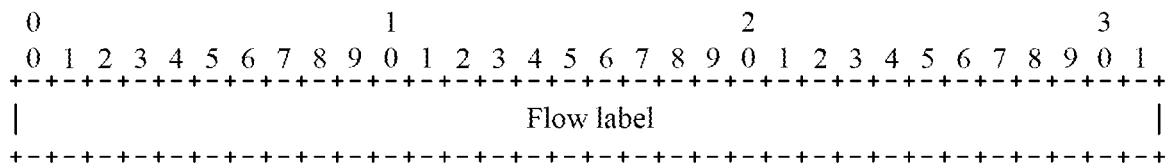
FIG. 8 is a schematic diagram of another format of a flow field according to an embodiment of the present application.
Figure 9:
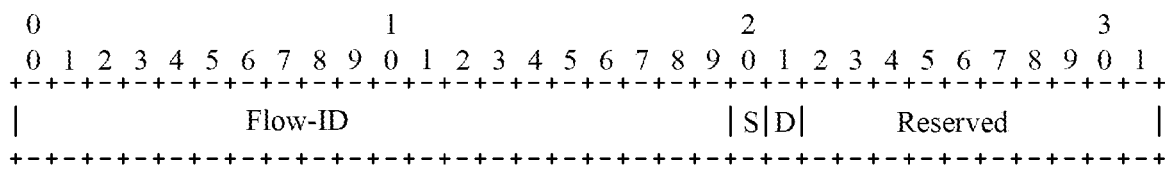
FIG. 9 is a schematic diagram of another format of a flow field according to an embodiment of the present application.

In the embodiment, there are three optional formats of the flow field. FIG. 7 is a schematic diagram of a format of a flow field according to an embodiment of the present application. As shown in FIG. 7, the format of the flow field is the format consisting of the flow identifier (Flow-ID) and the reserved bits (RESERVED). FIG. 8 is a schematic diagram of another format of a flow field according to an embodiment of the present application. As shown in FIG. 8, the flow field is in the format consisting of the flow label (Flow Label). FIG. 9 is a schematic diagram of another format of a flow field according to an embodiment of the present application. As shown in FIG. 9, the flow field is in the format consisting of the flow identifier (Flow-ID), the marker measurement field (SID), and the reserved bits (RESERVED). In the embodiment, the flow identifier may be defined as 20 bits, 24 bits, or 28 bits according to the performance measurement requirement and is configured for uniquely identifying a BIER multicast flow.

In an embodiment, the BIER flow identification information is generated by a network management system (NMS) or a controller and used for identifying the BIER flow to be detected. The BIER flow identification information is applicable to various data planes such as an MPLS data plane, a non-MPLS data plane, and an Internet Protocol version 6 (IPv6) data plane.

In an embodiment, the marker measurement field includes a first bit and a second bit: where a BIER packet is marked with the first bit being a first value and the second bit being a second value; or a BIER packet is marked with the first bit being a second value and the second bit being a first value.

In an embodiment, in the case where the first bit is the first value, it indicates a single marker measurement: and in the case where the second bit is the first value, it indicates a double marker measurement. For example, when the first bit is 1, it indicates the single marker measurement: and when the second bit is 1, it indicates the double marker measurement.

Figure 10:
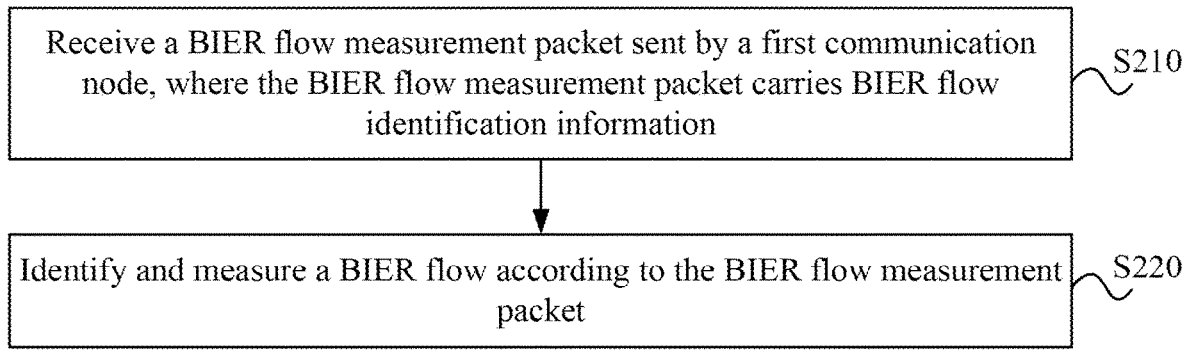
FIG. 10 is a flowchart of another performance measurement method according to an embodiment of the present application.

In an embodiment, FIG. 10 is a flowchart of another performance measurement method according to an embodiment of the present application. The embodiment is applied to a second communication node. For example, the second communication node may be a tail BFR node. As shown in FIG. 10, the embodiment includes S210 and S220.

In S210, a BIER flow measurement packet sent by a first communication node is received, where the BIER flow measurement packet carries BIER flow identification information.

In S220, a BIER flow is identified and measured according to the BIER flow measurement packet.

In an embodiment, the BIER flow identification information is configured for identifying a unique BIER flow and measuring and identifying the BIER flow.

In an embodiment, the BIER flow measurement packet is a service packet encapsulated in a BIER header, and the BIER flow identification information is carried in a BIER header encapsulation format.

In an embodiment, a flow field in the BIER header encapsulation format is extended for measuring and identifying the BIER flow.

In an embodiment, the BIER flow measurement packet is a service packet encapsulated in a BIER OAM header, and the BIER flow identification information is carried in a BIER OAM header encapsulation format.

In an embodiment, the BIER OAM header encapsulation format is extended for a new message type for indicating a BIER flow performance measurement message: and data corresponding to the BIER flow performance measurement message is extended for a flow field for measuring and identifying the BIER flow.

In an embodiment, a format of the flow field includes one of: a format including a flow identifier and reserved bits: a format including a flow label: or a format including a flow identifier, a marker measurement field, and reserved bits.

In an embodiment, the marker measurement field includes a first bit and a second bit: where a BIER packet is marked with the first bit being a first value and the second bit being a second value; or a BIER packet is marked with the first bit being a second value and the second bit being a first value.

In an embodiment, in the case where the first bit is the first value, it indicates a single marker measurement; and in the case where the second bit is the first value, it indicates a double marker measurement.

In an embodiment, the BIER flow identification information is generated by an NMS or a controller and used for identifying the BIER flow to be detected.

Figure 11:
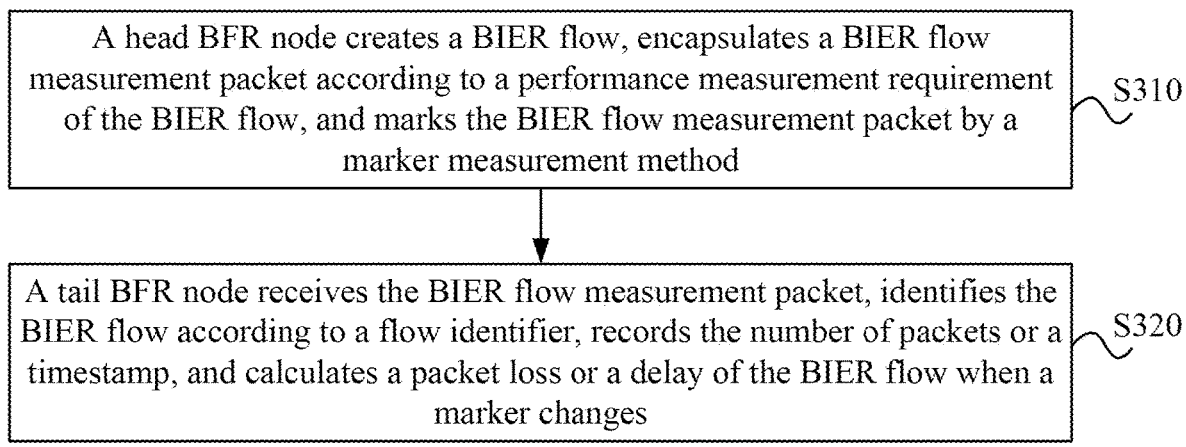
FIG. 11 is a flowchart of another performance measurement method according to an embodiment of the present application.

In an implementation, an embodiment of the present application provides a flow-based performance measurement method for a BIER network. The method extends flow-based BIER packet encapsulation for a flow field to identify a BIER flow and implement the marker performance measurement function of the BIER flow. FIG. 11 is a flowchart of another performance measurement method according to an embodiment of the present application. In the embodiment, a packet loss and a delay between BFR nodes at two ends of the BIER network are measured. As shown in FIG. 11, the method includes S310 and S320.

In S310, a head BFR node creates a BIER flow, encapsulates a BIER flow measurement packet according to a performance measurement requirement of the BIER flow, and marks the BIER flow measurement packet by a marker measurement method.

In S320, a tail BFR node receives the BIER flow measurement packet, identifies the BIER flow according to a flow identifier, records the number of packets or a timestamp, and calculates a packet loss or a delay of the BIER flow when a marker changes.

In the embodiment, the marker measurement method may be a single marker measurement or a double marker measurement. When receiving the BIER flow measurement packet, the tail BFR node identifies the BIER flow according to the flow identifier in BIER flow identification information and records the number of packets or the timestamp. When the marker changes, it indicates that BIER flow measurement packets corresponding to the BIER flow are sent completely, and the packet loss or the delay of the BIER flow may be calculated. For example, an S bit in the BIER flow measurement packet is 1. When the S bit changes from 1 to 0, it indicates that the S bit changes, and the number of lost packets and a packet loss rate of the BIER flow are calculated.

Figure 12:
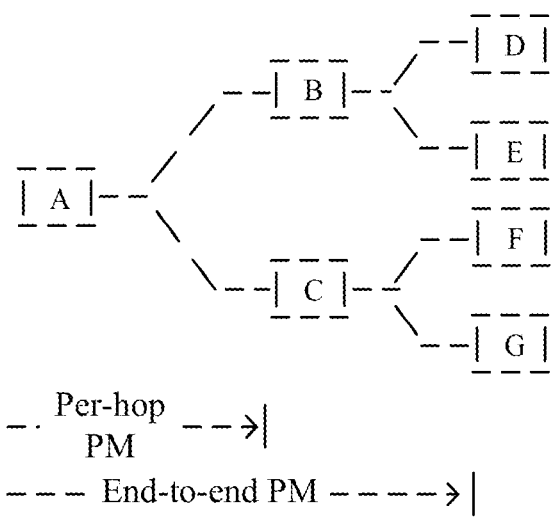
FIG. 12 is a structural diagram of a BIER network according to an embodiment of the present application.

In an implementation, FIG. 12 is a structural diagram of a BIER network according to an embodiment of the present application. As shown in FIG. 12, BIER multicast traffic is sent from a head node A to a tail node D, E, F, or G. In the embodiment, the identification and performance measurement of a BIER flow are described by using an example in which a per-hop packet loss of the BIER flow from the head node A to node C is measured by a single marker measurement method. The embodiment includes the following.

In step one, the head node A creates the BIER flow with N packets and encapsulates a BIER flow measurement packet by the single marker measurement method according to a performance measurement requirement of the BIER flow as described in the preceding embodiments: a flow field is carried in a BIER header encapsulation format of the BIER flow measurement packet, a Flow-ID is generated by an NMS or a controller and used for identifying the BIER flow to be detected, and an S bit and a D bit in a BIER header are set to 1 and 0, respectively. After the packets are sent completely, the Flow-ID of the BIER flow and the number of sent packets corresponding to the BIER flow are reported to the NMS or the controller.

In step two, node C receives the BIER flow measurement packet, parses the BIER header, identifies the BIER flow, and records the number of received packets: when the marker S changes, node C reports the Flow-ID of the BIER flow and the number of sent packets corresponding to the BIER flow to the NMS or the controller and calculates the number of lost packets and the packet loss rate of the BIER flow.

In an implementation, the BIER network shown in FIG. 12 is used in the embodiment, that is, BIER multicast traffic is sent from the head node A to the tail node D, E, F, or G. In the embodiment, the identification and performance measurement of a BIER flow are described by using an example in which an end-to-end packet loss of the BIER flow from the head node A to node G is measured by a double marker measurement method. The embodiment includes the following.

In step one, the head node A creates the BIER flow with a time interval of T and encapsulates a packet by the double marker measurement method according to the content of the present application: a flow field is carried in a BIER OAM header of the BIER packet, a BIER traffic measurement flow is encapsulated in the manner of a BIER OAM packet, a Flow-ID is generated by the NMS or the controller and used for identifying the BIER flow to be detected, a marker S is configured for creating spaced flows, and a marker D is configured for marking the packet and measuring a delay. A frequency at which the marker D changes may be increased so that the number of delay measurements is increased, thereby measuring a delay jitter. After packets are sent completely, the Flow-ID of the BIER flow and a packet sending timestamp corresponding to the BIER flow are reported to the NMS or the controller.

In step two, node G receives the packet, parses the BIER OAM header, identifies the BIER flow; and records the timestamps of these packets: when the marker D changes, node G reports the Flow-ID of the BIER flow and the packet sending timestamp corresponding to the BIER flow to the NMS or the controller and calculates the delay and the delay jitter.

Figure 13:
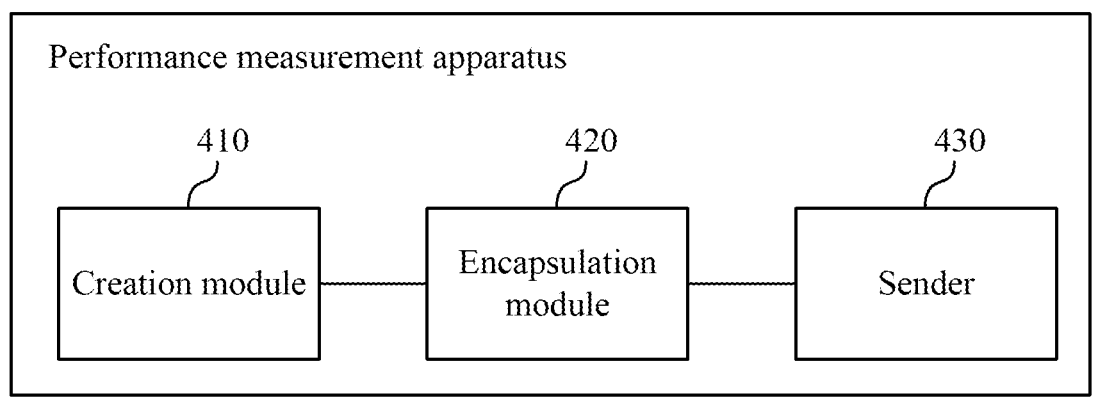
FIG. 13 is a block diagram of a performance measurement apparatus according to an embodiment of the present application.

In an embodiment, FIG. 13 is a block diagram of a performance measurement apparatus according to an embodiment of the present application. The embodiment is applied to a first communication node. As shown in FIG. 13, the embodiment includes a creation module 410, an encapsulation module 420, and a sender 430.

The creation module 410 is configured to create a BIER flow.

The encapsulation module 420 is configured to encapsulate a BIER flow measurement packet according to a performance measurement requirement of the BIER flow, where the BIER flow measurement packet carries BIER flow identification information.

The sender 430 is configured to send the BIER flow measurement packet to a second communication node.

The performance measurement apparatus provided in the embodiment is configured to perform the performance measurement method in the embodiment shown in FIG. 4. The performance measurement apparatus provided in the embodiment has similar implementation principles, which are not repeated here.

In an embodiment, the BIER flow identification information is configured for identifying a unique BIER flow and measuring and identifying the BIER flow.

In an embodiment, the BIER flow measurement packet is a service packet encapsulated in a BIER header: and that the BIER flow measurement packet is encapsulated according to the performance measurement requirement of the BIER flow includes carrying the BIER flow identification information in a BIER header encapsulation format.

In an embodiment, carrying the BIER flow identification information includes extending a flow field in the BIER header encapsulation format for measuring and identifying the BIER flow.

In an embodiment, the BIER flow measurement packet is a service packet encapsulated in a BIER OAM header; and the encapsulating the BIER flow measurement packet according to the performance measurement requirement of the BIER flow includes: carrying the BIER flow identification information in a BIER OAM header encapsulation format.

In an embodiment, carrying the BIER flow identification information includes extending the BIER OAM header encapsulation format for a new message type for indicating a BIER flow performance measurement message: and extending data corresponding to the BIER flow performance measurement message for a flow field for measuring and identifying the BIER flow.

In an embodiment, a format of the flow field includes one of: a format including a flow identifier and reserved bits: a format including a flow label; or a format including a flow identifier, a marker measurement field, and reserved bits.

In an embodiment, the marker measurement field includes a first bit and a second bit. A BIER packet is marked with the first bit being a first value and the second bit being a second value; or a BIER packet is marked with the first bit being a second value and the second bit being a first value.

In an embodiment, in the case where the first bit is the first value, it indicates a single marker measurement: and in the case where the second bit is the first value, it indicates a double marker measurement.

In an embodiment, the BIER flow identification information is generated by an NMS or a controller and used for identifying the BIER flow to be detected.

Figure 14:
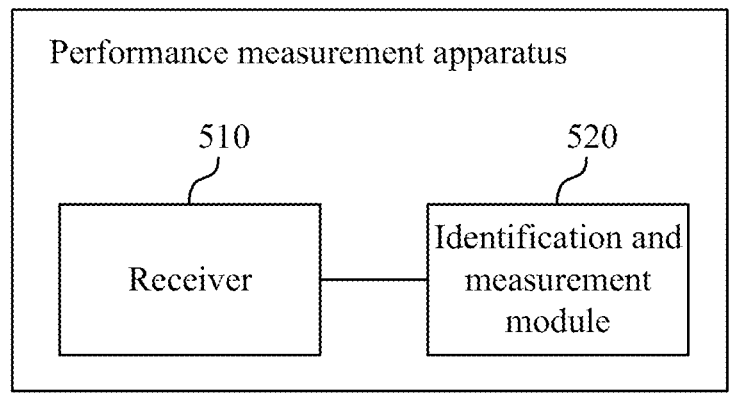
FIG. 14 is a block diagram of another performance measurement apparatus according to an embodiment of the present application.

FIG. 14 is a block diagram of another performance measurement apparatus according to an embodiment of the present application. The embodiment is applied to a second communication node. For example, the second communication node may be a tail BFR node. As shown in FIG. 14, the embodiment includes a receiver 510 and an identification and measurement module 520.

The receiver 510 is configured to receive a BIER flow measurement packet sent by a first communication node, where the BIER flow measurement packet carries BIER flow identification information.

The identification and measurement module 520 is configured to identify and measure a BIER flow according to the BIER flow measurement packet.

The performance measurement apparatus provided in the embodiment is configured to perform the performance measurement method in the embodiment shown in FIG. 10. The performance measurement apparatus provided in the embodiment has similar implementation principles, which are not repeated here.

Figure 15:
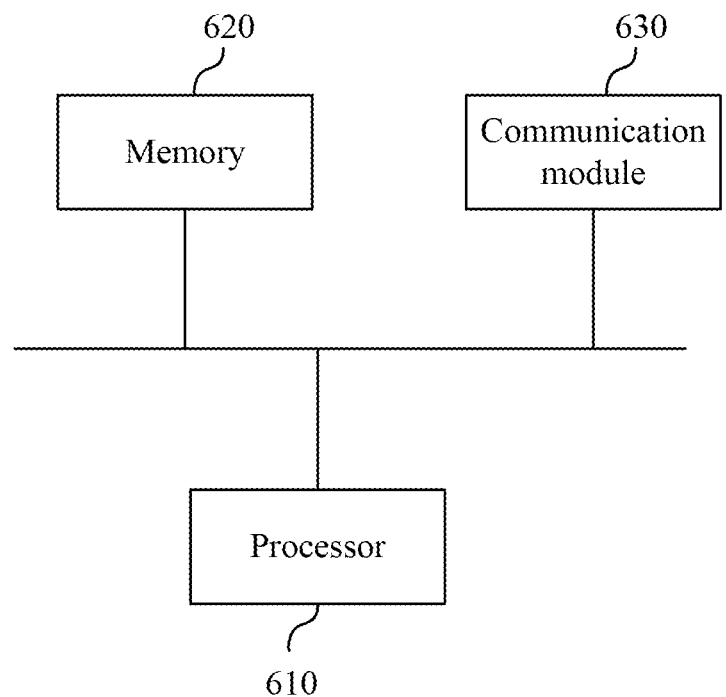
FIG. 15 is a structural diagram of a device according to an embodiment of the present application.

FIG. 15 is a structural diagram of a device according to an embodiment of the present application. As shown in FIG. 15, the device provided in the present application includes a processor 610, a memory 620, and a communication module 630. One or more processors 610 may be included in the device. One processor 610 is shown as an example in FIG. 15. One or more memories 620 may be included in the device. One memory 620 is shown as an example in FIG. 15. The processor 610, the memory 620, and the communication module 630 in the device may be connected via a bus or in other manners. The connection via a bus is shown as an example in FIG. 15. In the embodiment, the device is a first communication node, and the first communication node may be a head BFR node.

As a computer-readable storage medium, the memory 620 may be configured to store software programs, computer-executable programs, and modules, such as program instructions/modules (for example, a creation module 410, an encapsulation module 420, and a sender 430 in a performance measurement apparatus) corresponding to the device in any embodiment of the present application. The memory 620 may include a program storage region and a data storage region. The program storage region may store an operating system and an application program required by at least one function. The data storage region may store data created according to the use of the device. The memory 620 may include a high-speed random-access memory and may also include a nonvolatile memory, such as at least one magnetic disk memory, a flash memory, or another nonvolatile solid-state memory. In some examples, the memory 620 may include memories which are remotely disposed relative to the processor 610, and these remote memories may be connected to the device via a network. Examples of the preceding network include, but are not limited to, the Internet, an intranet, a local area network, a mobile communication network, and a combination thereof.

The communication module 630 is configured to perform communication interaction between the first communication node and a second communication node.

The preceding device may be configured to perform the performance measurement method applied by the first communication node in any one of the preceding embodiments and has corresponding functions.

In an embodiment, the preceding device may also be configured to perform the performance measurement method applied by the second communication node in any one of the preceding embodiments and has corresponding functions.

An embodiment of the present application further provides a storage medium including a computer-executable instruction. When the computer-executable instruction is executed by a computer processor, the computer processor performs a performance measurement method applied by a first communication node. The method includes: creating a BIER flow: encapsulating a BIER flow measurement packet according to a performance measurement requirement of the BIER flow, where the BIER flow measurement packet carries BIER flow identification information: and sending the BIER flow measurement packet to a second communication node.

An embodiment of the present application further provides a storage medium including a computer-executable instruction. When the computer-executable instruction is executed by a computer processor, the computer processor performs a performance measurement method applied by a second communication node. The method includes: receiving a BIER flow measurement packet sent by a first communication node, where the BIER flow measurement packet carries BIER flow identification information: and identifying and measuring a BIER flow according to the BIER flow measurement packet.

It is to be understood by those skilled in the art that the term "user equipment" covers any suitable type of wireless user equipment, for example, a mobile phone, a portable data processing device, a portable web browser, or a vehicle-mounted mobile station.

Generally speaking, various embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing device, though the present application is not limited thereto.

Embodiments of the present application may be implemented through the execution of computer program instructions by a data processor of a mobile device, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory device and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A performance measurement method, the method being applied by a first communication node and comprising:
   creating a Bit Index Explicit Replication (BIER) flow;
   encapsulating a BIER flow measurement packet according to a performance measurement requirement of the BIER flow, wherein the BIER flow measurement packet carries BIER flow identification information; and
   sending the BIER flow measurement packet to a second communication node;
   wherein the first communication node is a head Bit-Forwarding Router (BFR) node, each BIER flow corresponds to a unique BIER identifier, and the BIER identifier is comprised in the BIER flow identification information and a flow field carries the BIER flow identification information;
   wherein the BIER flow measurement packet is a service packet encapsulated in a BIER header; and
   wherein the encapsulating the BIER flow measurement packet according to the performance measurement requirement of the BIER flow comprises:
   carrying the BIER flow identification information in a BIER header encapsulation format;
   wherein carrying the BIER flow identification information in the BIER header encapsulation format comprises:
   extending the flow field in the BIER header encapsulation format for measuring and identifying the BIER flow;
   wherein a format of the flow field comprises one of: a format comprising a flow identifier and reserved bits; a format comprising a flow label; or a format comprising a flow identifier, a marker measurement field, and reserved bits;
   wherein the flow field is configured after the BIER header encapsulation format, and the marker measurement field comprised in the flow field consist of a first bit and a second bit;
   wherein the BIER flow measurement packet is marked with the first bit being a first value and the second bit being a second value; or the BIER flow measurement packet is marked with the first bit being a second value and the second bit being a first value; and
   wherein the BIER flow identification information is generated by a network management system (NMS) or a controller, and the BIER flow identification information is configured for identifying the BIER flow to be detected.

2. The method of claim 1, wherein the BIER flow identification information is configured for identifying a unique BIER flow and measuring the BIER flow.

3. The method of claim 1, wherein in a case where the first bit is the first value, the marker measurement field indicates that the performance measurement method uses a single marker measurement; and in a case where the second bit is the first value, the marker measurement field indicates that the performance measurement method uses a double marker measurement.

4. A performance measurement method, the method being applied by a second communication node and comprising:
   receiving a Bit Index Explicit Replication (BIER) flow measurement packet sent by a first communication node, wherein the BIER flow measurement packet carries BIER flow identification information; and
   identifying and measuring a BIER flow according to the BIER flow measurement packet;
   wherein the second communication node is a tail Bit-Forwarding Router (BFR) node, each BIER flow corresponds to a unique BIER identifier, and the BIER identifier is comprised in the BIER flow identification information and a flow field carries the BIER flow identification information;
   wherein the BIER flow measurement packet is a service packet encapsulated in a BIER header, and the BIER flow identification information is carried in a BIER header encapsulation format;
   wherein the flow field in the BIER header encapsulation format is extended for measuring and identifying the BIER flow, and a format of the flow field comprises one of: a format comprising a flow identifier and reserved bits; a format comprising a flow label; or a format comprising a flow identifier, a marker measurement field, and reserved bits;
   wherein the flow field is configured after the BIER header encapsulation format, and the marker measurement field comprised in the flow field consists of a first bit and a second bit;
   wherein the BIER flow measurement packet is marked with the first bit being a first value and the second bit being a second value; or the BIER flow measurement packet is marked with the first bit being a second value and the second bit being a first value; and
   wherein the BIER flow identification information is generated by a network management system (NMS) or a controller, and the BIER flow identification information is configured for identifying the BIER flow to be detected.

5. A device, comprising a communication circuit, a memory, and at least one processor; wherein
the communication circuit is configured to perform communication interaction between a first communication node and a second communication node;
the memory is configured to store at least one program; and
when the at least one program is executed by the at least one processor, the at least one processor performs the performance measurement method of claim 1.

6. A non-transitory storage medium storing a computer program, wherein when the computer program is executed by a processor, the processor performs the method of claim 1.

7. A performance measurement method, the method being applied by a first communication node and comprising:
creating a Bit Index Explicit Replication (BIER) flow;
encapsulating a BIER flow measurement packet according to a performance measurement requirement of the BIER flow, wherein the BIER flow measurement packet carries BIER flow identification information;
sending the BIER flow measurement packet to a second communication node;
wherein the first communication node is a head Bit-Forwarding Router (BFR) node, each BIER flow corresponds to a unique BIER identifier, and the BIER identifier is comprised in the BIER flow identification information and a flow field carries the BIER flow identification information;
wherein the BIER flow measurement packet is a service packet encapsulated in a BIER Operation Administration and Maintenance (OAM) header;
wherein the encapsulating the BIER flow measurement packet according to the performance measurement requirement of the BIER flow comprises:
carrying the BIER flow identification information in a BIER OAM header encapsulation format;
wherein carrying the BIER flow identification information in the BIER OAM header encapsulation format comprises:
extending the BIER OAM header encapsulation format for a new message type, wherein the new message type is configured for indicating that a message type of the BIER flow measurement packet is a BIER flow performance measurement message; and
extending data corresponding to the BIER flow performance measurement message for the flow field, wherein the flow field is configured for measuring and identifying the BIER flow;
wherein a format of the flow field comprises one of: a format comprising a flow identifier and reserved bits; a format comprising a flow label; or a format comprising a flow identifier, a marker measurement field, and reserved bits;
wherein the flow field is configured after the BIER OAM header encapsulation format, and the marker measurement field comprised in the flow field consists of a first bit and a second bit; wherein
the BIER flow measurement packet is marked with the first bit being a first value and the second bit being a second value; or
the BIER flow measurement packet is marked with the first bit being a second value and the second bit being a first value; and
wherein the BIER flow identification information is generated by a network management system (NMS) or a controller, and the BIER flow identification information is configured for identifying the BIER flow to be detected.

8. The method of claim 7, wherein the BIER flow identification information is configured for identifying a unique BIER flow and measuring the BIER flow.

9. The method of claim 7, wherein in a case where the first bit is the first value, the marker measurement field indicates that the performance measurement method uses a single marker measurement; and in a case where the second bit is the first value, the marker measurement field indicates that the performance measurement method uses a double marker measurement.

* * * * *